United States Patent [19]

Strecker

[11] 3,890,053

[45] June 17, 1975

[54] ADJUSTABLE LINK

[75] Inventor: William V. Strecker, Long Island City, N.Y.

[73] Assignee: Peck & Hale, Inc., West Sayville, N.Y.

[22] Filed: June 26, 1974

[21] Appl. No.: 483,402

[52] U.S. Cl. .................... 403/44; 403/118; 254/54
[51] Int. Cl. ............................................. F16b 7/06
[58] Field of Search ............ 403/43, 44, 45, 46, 47, 403/48, 118; 29/175 R; 254/54, 67; 301/92, 93; 114/109; 85/1 S, 1 L, 46

[56] References Cited
UNITED STATES PATENTS

| | | | |
|---|---|---|---|
| 529,039 | 11/1894 | Mewer | 85/1 S |
| 2,299,526 | 10/1942 | Cloud-Mantle | 403/44 |
| 2,340,300 | 2/1944 | Booth et al. | 403/46 |

Primary Examiner—Andrew V. Kundrat
Attorney, Agent, or Firm—Pennie & Edmonds

[57] ABSTRACT

An adjustable link assembly having a first elongated externally threaded member defining at least one longitudinally extending slot and having multi-start threads on the outer surface portions. A second elongated externally threaded member is received within the first member and has at least one longitudinally extending externally threaded leg which is received within each slot of the first member in longitudinal relation therewith, the leg threads being multi-start threads equal and opposite to the threads of the first member. An internally threaded sleeve embraces overlapping portions of the members in threaded engagement therewith and has at least two multi-start equal and opposite internal threads mating respectively with the external threads of the first and second members such that rotation of the sleeve in either of two directions produces extension or reduction of the length of the link. In its preferred form the link comprises a turnbuckle with the first two members being tubular members each having two slotted portions defining two legs for each member and the threads are multi-start threads having two start positions.

11 Claims, 5 Drawing Figures

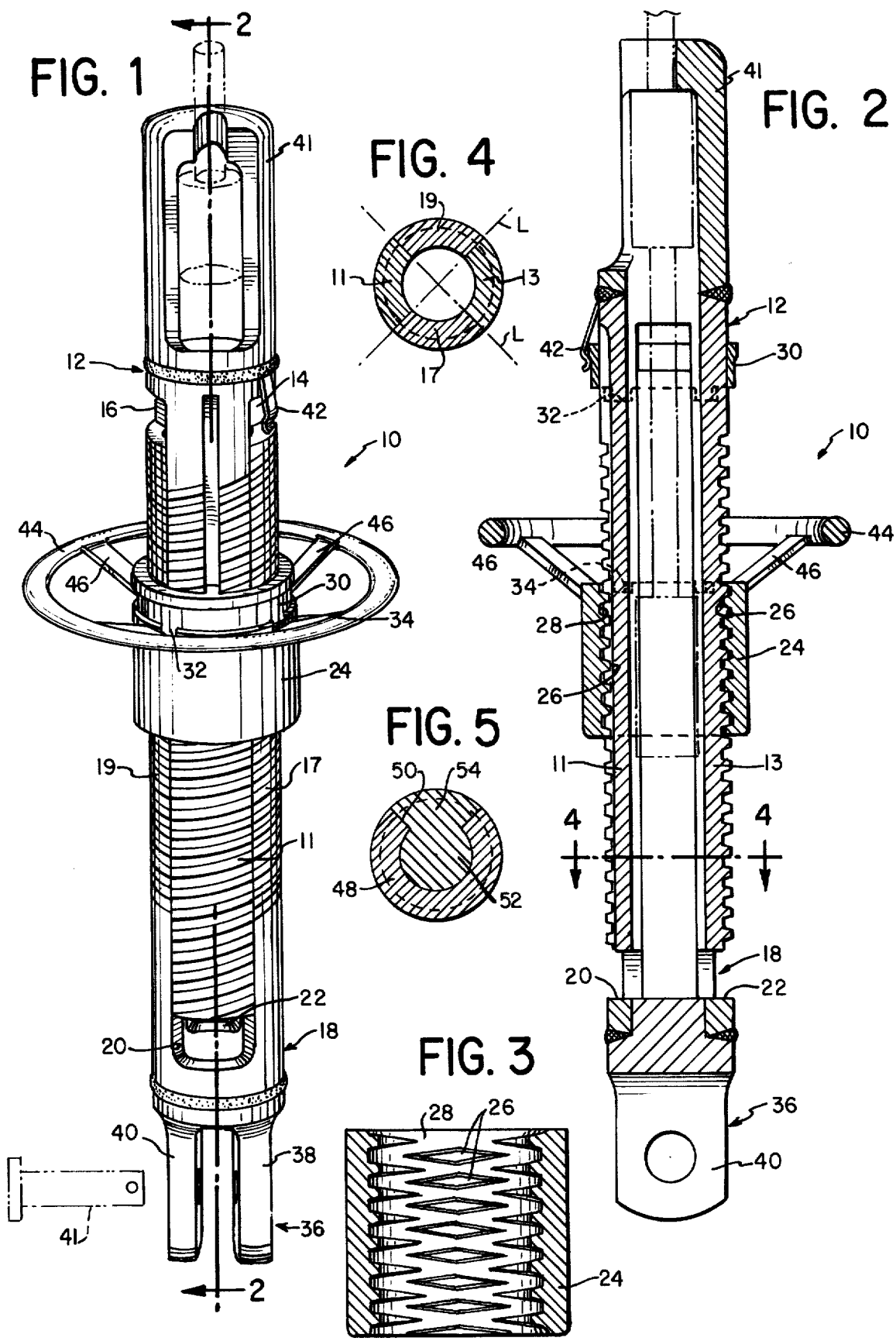

3,890,053

ADJUSTABLE LINK

BACKGROUND OF THE INVENTION

1. Field of the Invention

This invention relates to adjustable links such as turnbuckles.

2. Description of the Prior Art

It has been generally known to provide adjustable links such as turnbuckles to connect members or cables in a manner in which undesirable slack may be quickly eliminated by adjustment. With presently available turnbuckles, length and tension adjustments are accomplished by rotating threaded component parts of the turnbuckle relative to each other and into and out of a central internally threaded body. For example, a first link having right hand threads is provided at one end of the body, while a second link having left hand threads is provided at the other end. The body has correspondingly configured and oppositely disposed threads at each end such that rotation thereof provides adjustment of the total length of the turnbuckle. These three part turnbuckles, however, are not sufficiently compact and have limited length ranges between the fully extended and the fully retracted positions. Also, when the turnbuckle is unloaded, length adjustments require holding both ends while rotating the central body since holding one end will cause the other end to rotate with the body. In addition, the rate of adjustment of these turnbuckles is generally not very fast and they require substantial rotations of the adjustment member to achieve substantial length adjustments.

Commonly assigned U.S. Pat. No. 3,719,377 to Schultz, et al., discloses an inventive turnbuckle wherein course adjustments can be made by spacer members which slide along a turnbuckle adjusting rod and fine adjustments are made by rotating the central body.

In an attempt to improve adjustable link assemblies, in U.S. Pat. No. 2,340,300 to Booth the patentee disclosed an adjustable link having an externally threaded member defining a slot extending longitudinally along the threaded portion with a second member seated in the first member and having an externally threaded lug which is slidably received in the slot. A threaded sleeve surrounds the members. The first member contains a right hand thread and the second member contains a left hand thread having a lead which differs from the lead of the right hand thread. The sleeve contains internal threads which correspond respectively in pitch and lead to each of the external threads on the first and second members to permit the provision of reversed internal threads in the sleeve without having them mutilate each other. However by providing reversed threads of different leads the material forming the "islands" remaining on the inner portion of the sleeve is neither substantial nor symmetrical and thus reduces the force carrying capability of the link since that capability is dependent upon the shear resistance of the "islands" in the sleeve. Also the members of the Booth link differ in strength and the varying thread leads makes it difficult to adapt the device to mass production procedures. I have invented a link which avoids these disadvantages and makes possible a turnbuckle which is unknown in the prior art.

SUMMARY OF THE INVENTION

An adjustable link assembly which comprises a first elongated externally threaded member defining at least one longitudinally extending slot, the threads being multi-start threads having uniformly distributed start positions corresponding to the number of starts in the threads. A second elongated externally threaded member is received within the first member and has at least one longitudinally extending externally threaded lug received within each slot of the first member in a manner such that portions of the members are in overlapping relation and the lug threads comprise multi-start threads which are substantially equal and opposite to the threads on the other member and have uniformly distributed start positions corresponding to the number of starts in the threads. An internally threaded sleeve embraces overlapping portions of the first and second members in threaded engagement therewith and has at least two multi-start substantially equal and opposite internal threads mating respectively with the external threads of the first and second members such that rotating the sleeve in a first direction results in movement of the first and second members toward each other, and rotation of the sleeve in the opposite direction results in movement of the first and second members away from each other.

In a preferred embodiment, the first externally threaded member is in the form of a tubular member defining at least two opposed longitudinal slots which define at least two longitudinal lugs in the form of leg portions. The leg portions have a multi-start thread thereon having start positions distributed uniformly about the member. The second externally threaded member is configured as a tubular member which defines at least two opposite longitudinal slots to provide at least two longitudinal leg portions. The leg portions have multi-start threads thereon substantially equal and opposite to the threads of the leg portions of the other member and having start positions distributed uniformly about the member. The first and second members are complementarily configured and positioned such that leg portions of the second member are slidably received between the leg portions of the first member and the members are movable toward and away from each other. An internally threaded sleeve embraces overlapping leg portions of the members and has at least two substantially equal and opposite multi-start threads mating respectively and in an engagement with the multi-start threads of the first and second members such that rotating the sleeve in a first direction causes movement of the members toward each other and rotating the sleeve in the opposite direction causes movement of the members away from each other. It has been found that for most turnbuckle applications two-start threads are preferred.

A feature of the invention resides in the provision of the equal and opposite multi-start threads on the externally threaded members and correspondingly defined equal and opposite multi-start threads on the internal portion of the sleeve. The thread configuration, pitch, lead and number of starts of the threads will vary depending upon the diameter of the threaded members and the force carrying capability required for a given application.

The link provides threaded members which are compactly received with respect to each other while providing superior adjustability and strength as compared to links and turnbuckles known in the prior art. By providing various end connecting devices which will readily come to the minds of those skilled in the art, any number of turnbuckle requirements can be satisfied and the uses to which my link can be placed are innumerable. Moreover it is particularly intended as a preferred embodiment to define the link in the form of a turnbuckle as will hereafter be described.

BRIEF DESCRIPTION OF THE DRAWINGS

Preferred embodiments of the invention are described hereinbelow with reference to the drawings wherein:

FIG. 1 is a perspective view from above of the adjustable turnbuckle assembly constructed according to my invention;

FIG. 2 is a cross-sectional view of the turnbuckle taken along lines 2—2 of FIG. 1;

FIG. 3 is a view in cross section of the internal threaded portion of the rotatable sleeve shown around the turnbuckle of FIG. 1;

FIG. 4 is a cross-sectional view taken along lines 4—4 of FIG. 2; and

FIG. 5 is a cross-sectional view similar to that of FIG. 4, but of an alternate embodiment of the turnbuckle of FIGS. 1 and 2.

DETAILED DESCRIPTION OF THE PREFERRED EMBODIMENTS

In the following description threads are referred to as "single-start" and "multi-start" threads. A single start thread is a conventional thread having a single start position and defining a continuous helix along the threaded member. Thus the "Pitch" of a single start thread is defined as the number of threads per inch and the "Lead" is defined as the distance advanced along the threaded member which corresponds to one revolution of a threaded sleeve about the threaded member. A multi-start thread has more than one start position and defines continuous helices equal in number to the number of start positions. For example a cylindrical member having a two-start thread thereon will have two separate and continuous thread helices being independent of each other beginning at two diametrically opposed start positions and continuing along helical paths in side by side substantially "parallel" relation. Correspondingly, a three-start thread will have three thread portions and a four start thread will have four thread portions, and so on.

The helix angle for a multi-start thread is greater (or faster) than the helix angle for a single start thread. Also the distance or lead which an internally threaded sleeve will advance per revolution about a threaded member is greater for a multi-start thread than for a single start thread.

Referring now to FIGS. 1 and 2 there is illustrated a link assembly in the form of an adjustable turnbuckle 10 embodying the principles of the present invention. A first elongated tubular member 12 defining diametrically opposed slotted portions 14 and 16 is slidably received within a correspondingly configured externally threaded tubular member 18 having correspondingly positioned slotted portions 20 and 22. Preferably the slotted portions are defined by cut-out portions extending over approximately 90° of the circular cross-section of the tubular member as shown and illustrated by the dotted lines L in FIG. 4. Member 12 defines leg portions 11 and 13 while member 18 defines leg portions 17 and 19. Thus the configuration of each of the members 12 and 18 are complementary to each other thereby facilitating relative sliding movement toward and away from each other with the leg portions of each member overlapping longitudinally in relation with the leg portions of the other member. Each of the external surfaces of the leg portions 11, 13, 17 and 19 of each tubular members 12 and 18 respectively, is threaded with a two-start thread and each thread has two start positions which are equally spaced about periphery of the member at the starting cross section. The threads on one member are approximately equal and opposite in direction to the threads on the other member. The configuration of the threads are preferably defined by Acme specifications; however other thread configurations such as American Standard V, Buttress, Whitworth, etc., may be utilized.

A rotatable sleeve 24 is internally threaded with two reversed threads. Each thread is opposite to the other thread and each thread is a two-start thread, having two diametrically opposed start positions spaced approximately 180° from each other. Each thread portion of the two-start thread has a faster helix angle than a conventional single start thread of the same number of threads per inch with the result that each two start thread having $n$ threads per inch has two separate thread portions, each portion having $n/2$ threads per inch.

A second two-start thread of approximately equal lead, but opposite in direction to the first thread, is superimposed upon the first thread within the sleeve 24 with a resulting thread pattern as shown in FIG. 3.

Referring to FIG. 3 it is clear that the two superimposed reversed two-start threads produce uniformly distributed, truncated, pyramid shaped, symmetrical islands 26 which permit rotation of the sleeve 24 in either of two directions. In the sleeve 24 illustrated in FIG. 3 there are four rows of such truncated islands 26 equally spaced approximately 90° around the internal portion of the sleeve.

Referring once again to FIGS. 1 and 2, rotation of sleeve 24 in a first direction results in movement of members 12 and 18 toward each other, and rotation in the opposite direction, results in movement of members 12 and 18 away from each other. The force carrying capability of islands 26 is largely dependent upon the resistance to shear forces in a longitudinal direction. This in turn is largely dependent upon the shear area between each respective island and the surface portion 28 of the sleeve 24 to which it is secured. It can be readily observed that the symmetry of islands 26 facilitates improved force carrying capability of the link and that each member is approximately equal in strength to the other member. Moreover, the compact character of the overlapping members make it possible to withstand substantial forces both in tension and in compression. Such a feature was unknown in turnbuckles of the prior art.

While the device disclosed is preferably in the form of a turnbuckle as shown, it should be understood that the invention is broadly directed to links generally, and that such links may be used in any of a number of uses which will readily come to the minds of those skilled in the art. In any end use a significant advantage can readily be observed in that the extension or reduction of the length of the link can be accomplished by rotating only the central sleeve 24 while holding only one of the elongated members 12 and 18. The interlocking relation of the elongated members prevents each one from turning the other and from turning with the sleeve 24. This is particularly desirable in applications where turnbuckles are utilized for tieing down cargo on land, vehicles, or even sea-going vessels where with the three piece turnbuckles of the prior art it was necessary to hold both threaded members while rotating the central body to obtain uniform extension or reduction at both ends of the turnbuckle. In those cases if one end was held and the central body member rotated, the second end would rotate with the body if it was not securely held.

In the preferred embodiment illustrated, a locking sleeve 30 having tabs 32 is provided. The tabs 32 are configured to slide down the members 12 and 18 until they enter correspondingly configured slots 34 in the upper portion of sleeve 24 to prevent further rotation of the sleeve 24 thereby blocking further movement of the members toward or away from each other. As can be seen in FIG. 2, when the locking sleeve 30 is not to be moved, it is advantageously secured in position at the upper end of one member by a spring clamp 42.

Also, each end of the turnbuckle may have secured thereto various types of end connectors which provide means for connecting chains, ropes, lashing etc. For example, a clevis end 36 is provided having legs 38 and 40 and bolt 41 shown in phantom lines. Other suitable connectors such as the wire rope connector shown at 41, or rod ends, hooks, eyelets, etc. (not shown) secured, welded or otherwise connected to the tubular member, will readily become apparent to those skilled in the art. The tubular configuration of the members shown in FIG. 1 make it possible to feed the loose end portion of a lashing rope or cable down through the center of the turnbuckle.

A feature of the invention which is peculiarly related to the improved force carrying capability of the turnbuckle is the endless circular turning handle 44 connected to sleeve 24 by radial members 46. The handle facilitates the application of substantial turning forces due to the mechanical advantage provided by handle 44 which has a diameter greater than the outer diameter of sleeve 24. By gripping this handle it is possible to apply substantial turning forces to the sleeve 24 which would otherwise be difficult or impossible to achieve manually.

Referring now to FIG. 5 there is disclosed an alternate embodiment of the invention in which one member has one leg portion in the form of a lug. Elongated member 48 which defines an elongated cut-out portion (or slot) 50 is externally threaded with a two-start thread. Elongated member 52 is slidably received within member 48 and includes a lug member 54 which is threaded with a two-start thread equal and opposite to the two-start thread on member 48. The sleeve in this embodiment is idential to the sleeve previously described. Thus when the sleeve is rotated in a first or second direction, the elongated members 48 and 54 move equally toward or away from each other similar to members 12 and 18 in FIGS. 1 and 2.

In the embodiments described, it is possible to optimize the diameters of the elongated members and the specific types of multi-start threads to satisfy specific requirements. For example, the diameter of the elongated members and the number of starts of each thread selected, as well as the configuration of threads selected, may be optimized in a manner which provides optimum force carrying capability and adjustability.

I claim:
1. An adjustable link assembly which comprises:
   a. a first elongated externally threaded member defining at least one longitudinally extending slot, said threads being multi-start threads;
   b. a second elongated externally threaded member received within the first member and having at least one longitudinally extending externally threaded lug received within each slot of the first member in a manner such that portions of said members are in overlapping relation, said lug threads being multi-start threads substantially equal and opposite to the threads on the first member; and
   c. an internally threaded sleeve embracing overlapping portions of said first and second members in threaded engagement therewith, said sleeve having at least two multi-start substantially equal and opposite internal threads mating respectively with the external threads of said first and second members such that rotation of said sleeve in a first direction results in movement of the first and second members toward each other and rotation of said sleeve in the opposite direction results in movement of said first and second members away from each other.

2. An adjustable link assembly which comprises: a first externally threaded tubular member defining at least two opposed longitudinal slots to define longitudinal leg portions, the leg portions being threaded with multi-start threads; a second externally threaded tubular member defining at least two opposed longitudinal slots to define longitudinal leg portions complementarily configured and positioned with respect to the first member such that the leg portions of the second member are slidably received between the leg portions of the first member and the members are movable toward and away from each other, said threads on the second member being multi-start threads substantially equal and opposite to the threads on the first member; an internally threaded sleeve embracing overlapping leg portions of said members having at least two substantially equal and opposite multi-start threads mating respectively and in engagement with the multi-start threads of the first and second members such that rotation of said sleeve in a first direction causes movement of said members toward each other and rotation of said sleeve in the opposite direction causes movement of said members away from each other.

3. The adjustable link assembly according to claim 2 wherein said multi-start threads comprise two-start threads, one thread being a two-start right hand thread, the other thread being a two-start left hand thread.

4. The adjustable link according to claim 3 wherein said two-start threads are formed internally within said sleeve with each two-start thread having at least two thread portions having diametrically opposed start positions, the effective lead of each two start thread being approximately twice the effective lead of each thread portion such that when said outer sleeve is rotated, the rate of movement with respect to said sleeve of each of said first and second members corresponds to movement of members having a single start thread with the same number of threads per unit length but approximately one half the effective lead of the two-start threads.

5. The adjustable link assembly according to claim 4 further comprising connecting means at each end.

6. The adjustable link assembly according to claim 5 further comprising means for fixing the internally threaded sleeve in a pre-selected position with respect to the first and second members to prevent further rotation of the sleeve and corresponding extension or contraction of said link.

7. The adjustable link assembly according to claim 6 further comprising an endless substantially circular handwheel connected to said internally threaded sleeve to manually rotate said sleeve to extend or contract said link.

8. The adjustable link assembly according to claim 7 further comprising a connecting clevis secured to one end of at least one threaded member.

9. The adjustable link assembly according to claim 8 further comprising a wire rope connecting buttstop secured to at least one end of at least one threaded member.

10. An adjustable turnbuckle assembly which comprises: a first externally threaded elongated member defining at least two opposed longitudinal legs, the legs having multi-start threads thereon; a second externally threaded tubular member defining at least two opposed longitudinal legs, the legs having multi-start threads substantially equal and opposite to the threads of the first member, the legs of the first member being configured and positioned to slidably and complementarily receive the legs of the second member therebetween such that movement of the members away from each other extends the length of the turnbuckle and movement of the members toward each other reduces the length of the turnbuckle; an internally threaded sleeve embracing overlapping portions of the legs of each member having at least two substantially equal and reversed internal multi-start threads which mate and engage respectively with the external threads of the first and second members such that rotation of the sleeve in a first direction causes movement of the members away from each other and rotation of the sleeve in the opposite direction causes movement of the members toward each other; and means connected to one end of at least one member for connecting the turnbuckle to an external connecting means.

11. An adjustable link assembly which comprises:

a. a first tubular elongated externally threaded member defining at least one elongated slot extending longitudinally of the member and radially from the inner opening of the tube to the outer surface thereof, said member being threaded on its outer surface with a two-start thread;

b. a second elongated member received within the first member and having at least one elongated externally threaded lug configured to be slidably received within each elongated slot of the first member in a manner such that portions of said members are in overlapping relation, said lug being threaded on its outer surface with a two-start thread which is substantially equal and opposite to the threads on the first member; and c. an internally threaded sleeve embracing overlapping portions of said first and second members in threaded engagement therewith, said sleeve having at least two two-start substantially equal and reversed internal threads mating respectively with the external threads of said first and second members such that rotation of said sleeve in a first direction results in movement of the first and second members toward each other causing the length of the link to be reduced, and rotation of said sleeve in the opposite direction results in movement of said first and second members away from each other thereby extending the length of said link.

* * * * *